United States Patent [19]

Bailey

[11] 3,858,346

[45] Jan. 7, 1975

[54] CONTROL OF SUBTERRANEAN TERMITES
[75] Inventor: Floyd Leroy Bailey, Jackson, Miss.
[73] Assignee: Allied Chemical Corporation, Morristown, N.J.
[22] Filed: Jan. 29, 1973
[21] Appl. No.: 327,340

[52] U.S. Cl............... 43/124, 424/84, 424/352
[51] Int. Cl.................. A01m 1/02, A01m 1/20
[58] Field of Search .... 424/84, 352; 43/124, 132 R, 43/132 A

[56] References Cited
UNITED STATES PATENTS
2,996,553   8/1961   Johnson .................... 260/648 C
3,070,495   12/1962  Esenther et al................ 424/84
3,220,921   11/1965  Greenbaum .................. 424/352

OTHER PUBLICATIONS
Smythe et al., J. of Economic Entomology Vol. 60, No. 1, (1967), pp. 228–233.

Primary Examiner—Albert T. Meyers
Assistant Examiner—Donald B. Moyer
Attorney, Agent, or Firm—Fred L. Kelly

[57] ABSTRACT

Control of subterranean termites in buildings is carried out by impregnating at least the exposed lower timbers of the building with a termiticidally effective amount of hexachlorocyclopentadiene dimer in a liquid organic solvent carrier. Preferably, termite infestation in the ground under and surrounding the building is also controlled by baiting. The bait consists of a termite-attracting carbohydrate carrier containing a termiticidally effective amount of hexachlorocyclopentadiene dimer. For baiting, it is only necessary to make holes in the ground at 1–2 yard intervals and insert 10–20 grams of the bait into each hole.

3 Claims, No Drawings

CONTROL OF SUBTERRANEAN TERMITES

BACKGROUND OF THE INVENTION

This invention relates to a method for controlling subterranean termites in buildings. The term termite is applied to a family of insects composing the order Isoptera, which have a superficial resemblance to ants, though far removed from them in structure. They also resemble ants in being social insects. They are widely distributed in tropical countries, but also occur in the temperate parts of North and South America and a few have established themselves in Europe. Their food consists for the most part of wood, especially in a state of incipient decay, but they also eat a great variety of substances. The termite society consists for the most part of workers, wingless, sexually immature individuals. Besides these workers there is a less numerous caste of large-headed, blind strong-jawed soldiers. The workers collect food, form nests and tunnels, and care for the males, females, eggs and larvae. The males and females have wings, which the latter lose after impregnation. Then, the female or queen undergoes a remarkable change, becoming enormously distended with eggs. The queen is extremely prolific, having been known to lay 60 eggs in a minute. In the spring the young winged males and females leave the nest in a swarm, after which pairing takes place; the survivors becoming the parents of new colonies.

Termites, the world over, are the most destructive of insect species attacking wood and cellulose products. Millions of dollars are lost annually in the United States as a direct result of termite damage by the subterranean termite. One of the most destructive subterranean species, Reticulitermes flavipes (Kollar), has established itself in the populous northeastern United States. Of the fifteen species of subterranean termites considered to be pests of major economic importance, four species of Reticulitermes, R. flavipes, R. hesperus. R. hageni, and R. virginicus, are responsible for most of the damage.

At present, buildings are usually protected against the subterranean termite by use of soil poisons, e.g., all areas of soil adjacent to the building structure are treated with a persistent organochlorine insecticide, preferably in the form of a 0.5 percent dispersion in water. A trench is dug around the outside of the building, the depth depending on the nature of the soil, and the insecticide dispersion is applied at the rate of 2 gallons per 5 linear feet. The fill dirt is usually similarly treated before being replaced. This method presents serious ecological problems because of the relatively large amounts of toxicant required for adequate protection.

Two types of wood preservatives are in wide use for protecting timber against termites. They are creosote and waterborne preservatives of the copper-chrome-arsenic type. These are applied by vacuum pressure methods. Unfortunately, the copper-chrome-arsenic preservatives are highly toxic to man, and due to difficulties with overpainting, odor, and cleanliness, the use of creosote is usually confined to roof timbers.

Because no known method for controlling subterranean termites in buildings is entirely satisfactory, extensive efforts have been made to develop an improved control method that will result in substantially complete termite control at relatively low cost.

SUMMARY OF THE INVENTION

The main object of this invention is to provide an improved method of controlling subterranean termites in buildings.

Another object of this invention is to provide a toxic termite bait that is not immediately toxic to foraging termite workers, so that the workers can feed the bait to other members of the termite colony.

Another object of this invention is to provide a toxic termite bait that is highly attractive to termites.

Another object of this invention is to provide a method for controlling subterranean termites with minimum danger to the ecology.

Other objects and advantages will be apparent from the following detailed description.

Briefly stated, the present improved method of controlling termites in buildings comprises impregnating at least the exposed lower timbers of the building with a termiticidally effective amount of hexachlorocyclopentadiene dimer dissolved in a liquid organic solvent carrier. By hexachlorocyclopentadiene dimer is meant the $C_{10}Cl_{12}$ compound having a melting range of 483° to 487°C. prepared in accordance with U.S. Pat. No. 2,996,553. Suitable solvents for use in the present invention include lower molecular weight hydrocarbons and halogenated derivatives thereof such as benzene, kerosene, carbon tetrachloride and the like; lower molecular weight ketones such as acetone; lower aliphatic ethers; and lower aliphatic alcohols having two or more carbon atoms. Preferably, the solvent has a boiling point between about 50° and 300°C. at atmospheric pressure.

The termiticidal solution of the present invention preferably contains 0.001 to 2 percent, more preferably 0.01 to 1 percent, of the hexachlorocyclopentadiene dimer, based on the weight of the organic solvent carrier.

Effective methods of impregnating the building timbers include brushing or spraying the termiticidal solution on the exposed surface of the timbers, or immersing the timbers in the solution for at least about 10 seconds. Desirably, the building timbers are impregnated prior to construction of the building; however, excellent control of termites has also been obtained when completed buildings were treated in accordance with the present invention. Normally, the building timbers are impregnated at the rate of about one gallon of solution per 100 to 200 square feet of timber surface.

It has been found that the impregnation of building timbers in accordance with the present invention is also effective in controlling attack on said timbers by members of the family Kalotermitidae, known as drywood termites, as well as members of the order Coleoptera, known as beetles. This order is next in importance to the Isoptera for wood-destroying species. Indeed, in a number of regions, such as the North Temperate Zone, beetles are of primary importance as wood destroyers.

DESCRIPTION OF THE PREFERRED EMBODIMENT

In accordance with one preferred embodiment of the invention, the aforesaid treatment of the timbers of the building with termiticidal solution is carried out in combination with a termite baiting operation to control any termite infestation in the ground under the building or in the ground surrounding the building. The bait utilized consists essentially of a solid, termiteattracting carbohydrate carrier containing about 0.001 to 2 percent, preferably 0.01 to 1 percent, based on the weight of said carbohydrate carrier, of a termiticide consisting essentially of hexachlorocyclopentadiene dimer. A termiticidally effective amount of this bait is inserted into the ground at about 0.5 to 3 yard intervals under and surrounding the building. Highly favorable results have been obtained using this preferred method and substantially complete control of the termites has been achieved.

Suitable termite-attracting carbohydrate carriers for use in accordance with the invention include citrus pulp, beet pulp, and other low-cost carbohydrate-containing by-products of the food industry. Wood industry by-products such as sawdust may also be used. However, it is known that termites are strongly attracted to wood in a state of incipient decay. Accordingly, a desirable termite-attracting carbohydrate carrier may state prepared by inoculating wood with a culture of a wood decaying fungus such as the well-known white rots, brown rots and soft rots, and subjecting the inoculated wood to ambient conditions of temperature and humidity which are conducive to growth of the fungus and thereby cause decay of the wood. Also, this decayed wood may be macerated and mixed with sawdust or other carbohydrate material to form the termite-attracting carbohydrate carrier of the invention. Preferably, the termite-attracting carbohydrate carrier comprises sawdust or citrus pulp and about 1 to 10 weight percent of wood in a state of incipient decay. This mixture is highly effective and low in cost.

Surprisingly, the only insecticide that I have found to be non-repellent to termites at termiticidally effective concentrations is hexachlorocyclopentadiene dimer when used in accordance with the present invention. I have found that hexachlorocyclopentadiene dimer at toxicant levels of 0.001 to 2 percent, based on the weight of the termite-attracting carbohydrate carrier, is attractive to termites, whereas other insecticides, including chlorinated hydrocarbons and organophosphorus compounds, show various degrees of repellency. Moreover, the hexachlorocyclopentadiene dimer is a slow-acting termiticide, requiring 12 hours or more to affect termites. Thus, the instant termite bait is not immediately effective against foraging termite workers that find the bait, so that these workers feed the bait to other members of the termite colony, including the queen and the larvae.

The following examples are provided to more fully illustrate the instant invention.

EXAMPLE 1

Ten newly constructed buildings were used in this example. The buildings were of the type having suspended floors with crawl-space of about 24 inches between the ground and bottom surface of the floor joists or beams. The termiticidal solution used contained about 95.5 weight percent deodorized kerosene and about 0.5 weight percent of hexachlorocyclopentadiene dimer prepared in accordance with U.S. Pat. No. 2,996,553. Prior to construction, the building sites were marked out and all natural termite foods such as tree stumps were removed. In addition, every effort was made during the construction period to prevent waste wood of any description from being left in the vicinity of the buildings. The termite control treatment of the buildings involved spraying or painting the exposed lower timbers of the building with the above-described termiticidal solution at the rate of about one gallon of solution per 150 square feet of timber surface. This required two or more coats, depending on the absorption and condition of the wood. In the case of the relatively heavy beam timbers, the wood was also drilled with a one-eighth inch bit at 12-inch intervals to a depth of half the thickness of the timber, and these holes were then injected with the hexachlorocyclopentadiene dimer solution under pressure.

The thus-treated buildings, without further treatment, were inspected for termite damage each month for 14 months. It was found that the buildings showed no damage from termites, although the general area was known to be infested with the subterranean termite Reticulitermes flavipes. Moreover, similar results were obtained in other buildings where the timbers were pretreated by immersing the timbers for about 10 seconds in a 0.01 to 1.0 weight percent solution of hexachlorocyclopentadiene dimer in benzene. Other solvents used included acetone, lower aliphatic alcohols having two or more carbon atoms and commercially available dry cleaning solvents.

EXAMPLE II

In this example, a building was protected against termites as described in Example I. However, in addition, poison baiting of the termites was carried out in a 1,000 square yard area under and surrounding the building. The poisoned termite bait was prepared as follows:

Moist soil was placed in soil containers and the soil was overlaid with thin strips of pine wood. The wood was inoculated with the wood-decaying fungus Lenzites trabea and incubated at 80°F. and 70 percent relative humidity until the wood was covered with mycelium (about 15 days). The wood strips were then macerated and mixed with about 100 parts by weight of pine sawdust. The resulting mixture was blended with about 0.1 percent, based on the weight of the sawdust, of hexachlorocyclopentadiene dimer prepared in accordance with U.S. Pat. No. 2,996,553. This bait was found particularly suitable for use in accordance with the present invention.

The application of the bait was simple. In the 1,000 square yard area under and surrounding the building, holes were made in the ground at 1 yard intervals with a metal bar and about 10 grams of the bait was inserted into each hole. The bait was then covered with about 1 inch of soil and a marker stake was placed adjacent to the bait. The marker stakes were of white pine impregnated with a one percent hexachlorocyclopentadiene dimer solution in benzene. These marker stakes were inserted to mark the position of the bait for subsequent inspection and can be eliminated in ordinary use of the present invention.

By means of the marker stakes, the bait samples were located and inspected at 2, 4 and 12 month intervals after installation. The marker stakes showed little or no termite damage. On the other hand, 38 baits were attacked by termites after two months, 4 additional baits were attacked after four months, and no additional baits were attacked after twelve months. The baits attacked were usually almost completely consumed. It is apparent from these results that an abrupt suppression of termite foraging occurred in the area under and surrounding the treated building. No termite attack on the building was found during the 12 -month period.

Similar results were obtained when the bait consisted of dried citrus pulp containing about 5 percent of wood in a state of incipient decay and about 0.4 percent hexachlorocyclopentadiene dimer, based on the weight of the citrus pulp.

DEFINITIONS

The term "carbohydrate" as used herein may be defined as any of a group of neutral compounds composed of carbon, hydrogen, and oxygen, and in which the ratio of hydrogen to oxygen is the same as in water. Starch is a familiar term applied to a complex carbohydrate which is found abundantly in plants. The complexity of starch is shown by the fact that unlike sugars, starch does not dissolve in water. Celluloses are carbohydrates that form the principal constituents of the cell walls of plants, and thus are the framework of the tissues. Woods are composed mainly of cellulose in combination with lignins. The preferred carbohydrate carrier of the present invention contains the bulk of the carbohydrate in the form of water-insoluble polysaccharides; however, a small proportion of mono- or disaccharides is desirable.

I claim:

1. A method of controlling subterranean termites in buildings of the type having floors suspended above the ground by means of wooden floor joists, which comprises the following steps:

a. spraying the surface of the floor joists with a termiticidal solution of hexachlorocyclopentadiene dimer in a solvent carrier selected from the group consisting of benzene, kerosene, carbon tetrachloride, acetone and ethyl alcohol, said solution containing 0.01 to 1 percent of hexachlorocyclopentadiene dimer, based on the weight of the solvent, said solution being applied to the surface of the floor joists at the rate of about 1 gallon of solution per 100 to 200 square feet of said surface;

b. preparing a bait for said termites consisting of a mixture of sawdust, 0.01 to 1 percent of hexachlorocyclopentadiene dimer, based on the weight of said sawdust, and 1 to 10 percent of wood in a state of incipient decay, based on the weight of said sawdust; and c. burying a termiticidally effective amount of said bait in holes in the ground under said building, said holes being spaced at intervals of 0.5 to 3 yards, with about 10 to 20 grams of said bait being buried in each hole.

2. The method of claim 1 wherein the solvent carrier is kerosene.

3. The method of claim 1 wherein the bait contains pine wood in a state of incipient decay, said pine wood having been decayed by the wood-decaying fungus Lenzites trabea.

* * * * *